United States Patent
Nobutani (10) Patent No.: US 9,513,854 B2
(45) Date of Patent: Dec. 6, 2016

(54) NETWORK DEVICE FOR HANDLING PROCESS REQUEST IN A FOLDER

(71) Applicant: Seiko Epson Corporation, Tokyo (JP)

(72) Inventor: Tsutomu Nobutani, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/760,723

(22) PCT Filed: Mar. 25, 2014

(86) PCT No.: PCT/JP2014/001712
§ 371 (c)(1),
(2) Date: Jul. 14, 2015

(87) PCT Pub. No.: WO2014/156128
PCT Pub. Date: Oct. 2, 2014

(65) Prior Publication Data
US 2015/0355869 A1    Dec. 10, 2015

(30) Foreign Application Priority Data

Mar. 29, 2013    (JP) .................................. 2013-071876

(51) Int. Cl.
*G06K 15/00* (2006.01)
*G06F 3/12* (2006.01)
(Continued)

(52) U.S. Cl.
CPC .............. *G06F 3/1227* (2013.01); *B41J 29/00* (2013.01); *B41J 29/38* (2013.01); *G06F 3/122* (2013.01);
(Continued)

(58) Field of Classification Search
CPC ...... G06F 3/122; G06F 3/1206; G06F 3/1222; G06F 3/1227; G06F 3/1228; G06F 3/127; G06F 3/1285; G06F 3/1286; G06F 17/30235; G06F 17/30115; B41J 29/00; B41J 29/38; H04N 1/00; H04N 1/21
(Continued)

(56) References Cited

U.S. PATENT DOCUMENTS 5,113,494 A * 5/1992 Menendez ............. G06K 15/00
345/501
9,286,307 B2 * 3/2016 Maeda ............. G06F 17/30117
(Continued)

FOREIGN PATENT DOCUMENTS

CN    101807139 A    8/2010
JP    2002-251347 A    9/2002
(Continued)

*Primary Examiner* — Gabriel Garcia
(74) *Attorney, Agent, or Firm* — Nutter McClennen & Fish LLP (57) ABSTRACT

A network device that can be used without requiring a device driver dependent upon the environment of an external device, a network printer, and a control method of a network device are provided. A file server has a management unit configured to manage a folder and information; a folder creation unit configured to create on the file server the folder to receive a process request from a client terminal; a process execution unit configured to execute a specific process when the process request is received in the folder; and a process result reporting unit configured to report the process result of the process execution unit to the folder.

6 Claims, 7 Drawing Sheets

(51) Int. Cl.
  *B41J 29/00* (2006.01)
  *B41J 29/38* (2006.01)
  *H04N 1/00* (2006.01)
  *H04N 1/21* (2006.01)

(52) U.S. Cl.
  CPC ............ *G06F 3/1206* (2013.01); *G06F 3/127* (2013.01); *G06F 3/1222* (2013.01); *G06F 3/1228* (2013.01); *G06F 3/1285* (2013.01); *G06F 3/1286* (2013.01); *H04N 1/00* (2013.01); *H04N 1/21* (2013.01)

(58) Field of Classification Search
  USPC ... 358/1.1, 1.13, 1.14, 1.15, 1.16, 1.18, 302; 707/1, 829, 831
  See application file for complete search history.

(56) References Cited

U.S. PATENT DOCUMENTS

| | | | |
|---|---|---|---|
| 2002/0083131 A1 | 6/2002 | Machida | |
| 2003/0151050 A1 | 8/2003 | Fox et al. | |
| 2005/0073717 A1* | 4/2005 | Arakawa | G06F 3/1204 358/1.15 |
| 2006/0206605 A1 | 9/2006 | Machida | |
| 2008/0148137 A1 | 6/2008 | Terao et al. | |
| 2008/0239387 A1* | 10/2008 | Otsuka | G06F 3/1204 358/1.15 |
| 2009/0219568 A1 | 9/2009 | Machida | |
| 2010/0208288 A1 | 8/2010 | Wu et al. | |
| 2011/0038005 A1 | 2/2011 | Ochiai et al. | |
| 2011/0128584 A1* | 6/2011 | Kuroshima | G06F 3/1205 358/1.15 |
| 2012/0110046 A1* | 5/2012 | Oba | G06F 17/30235 707/829 |
| 2012/0243018 A1 | 9/2012 | Shirota et al. | |
| 2014/0211259 A1 | 7/2014 | Ochiai et al. | |

FOREIGN PATENT DOCUMENTS

| | | |
|---|---|---|
| JP | 2005-108116 A | 4/2005 |
| JP | 2006-011526 A | 1/2006 |
| JP | 2008-152546 A | 7/2008 |
| JP | 2010-020489 A | 1/2010 |
| JP | 2010-069681 A | 4/2010 |
| JP | 2010-089287 A | 4/2010 |
| JP | 2010-089288 A | 4/2010 |
| JP | 2010-113702 A | 5/2010 |
| JP | 2011-028557 A | 2/2011 |
| JP | 2012-203461 A | 10/2012 |
| JP | 2012-215986 A | 11/2012 |

* cited by examiner

NETWORK DEVICE FOR HANDLING PROCESS REQUEST IN A FOLDER

Priority is claimed under 35 U.S.C. §119 to Japanese Application No. 2013-071876 filed on Mar. 29, 2013 and under 35 U.S.C. §365 to PCT/JP2014/001712 filed on Mar. 25, 2014.

TECHNICAL FIELD

The present invention relates to a network device that is connected to an external device through a network, to a network printer, and to a control method of a network device.

BACKGROUND

Devices such as printers and scanners are commonly used connected through a network to a computer (client terminal). Device drivers for controlling the devices are required to use such devices. Such device drivers are generally installed to a computer connected to the devices. (See, for example, PTL 1.)

PATENT LITERATURE

PTL 1: JP-A-2002-251347

SUMMARY OF INVENTION

However, because device driver operation depends on the operating system (OS) of the computer on which it is installed, the user must install a device driver that is compatible with the OS installed on the user's computer. This can be a problem for users that are not particularly knowledgeable about computers because determining the version of the operating system or installing software (device drivers) can be difficult. Computers that are remote connected as thin clients, and computers on which device drivers cannot be installed for security reasons, also cannot use such network devices. The device manufacturer must also develop device drivers for different computer operating systems, thus increasing development costs.

With consideration for the foregoing problems, an object of the present invention is to provide a network device that can be used without requiring a device driver that depends on the operating environment of the external device, to a network printer, and to a control method of a network device.

Solution to Problem

A network device according to the invention includes: a file server including a management unit, configured to manage a folder and information; a folder creation unit configured to create a folder on the file server to receive process requests from an external device through the management unit; a detection unit configured to detect receiving a process request in the folder; a process execution unit configured to execute a specific process when the process request is received in the folder; and a process result reporting unit configured to report the process result of the process execution unit to the folder.

A control method of a network device according to the invention includes: creating a folder to receive process request information indicating a process request from an external device connected by a network; detecting receiving the print request information in the created folder; executing a process contained in the process request information when the process request information is received; and reporting the execution result of the process contained in the process request information to the folder.

When an external device uses a network device in this aspect of the invention, the external device can execute a process on the network device by writing a process request (information indicating a process request) to a folder created in a file server on the network device. Furthermore, because the network device writes (reports) the result of processing to the folder, the external device can access the folder and get the process result.

More specifically, because accessing and controlling a network device from the external device can be done by accessing the file server (file system), the device can be used without installing a device driver on the external device side. Furthermore, installing a device driver not dependent on the operating system of the external device (that is, a device driver compatible with the network device itself) on the network device side is sufficient to enable communication between the external device and network device by accessing the file server, and a device can be used in new operating system environments without developing a new device driver specifically for the operating system.

Preferably, the network device according to the invention also has an access privilege setting unit configured to set an access privilege to the folder for a user of the external device; receiving process request from the external device to the folder is permitted when the user is permitted to access the folder, and receiving process requests from the external device to the folder is rejected when the user is not permitted to access the folder.

This aspect of the invention enables setting the access privilege to the folder that receives process requests for users of external devices. As a result, user restrictions such as permitting specific users to use a device and not permitting specific users to use a device can be easily controlled.

A network printer according to the invention has a communication unit configured to communicate with an external device through a network; a file server including a management unit configured to manage a folder and information; a folder creation unit configured to create a folder on the file server to receive print request from the external device through the management unit; a print request detection unit configured to detect receiving a print request in the folder; a print unit configured to print based on print object information corresponding to the print request when a print request is received in the folder; and a process result reporting unit configured to report the print result of the print unit to the folder.

In a network printer according to the invention, the information is preferably a folder name, and a file containing a folder name and access control information.

In a network printer according to the invention, the information preferably includes folder properties or directory information for the file.

Preferably in a network printer according to the invention, the print request received in the folder is a print request file written to the folder; the network printer further comprising: a response substitution unit configured to create and replace the print request file with a response file indicating the print request can be processed when a print request file is written to the folder; a print object detection unit configured to detect replacement of the print object file corresponding to the print object information with the response file in the folder; a print data generating unit configured to generate print data based on the print object information that converted the print object file to a format processable by the print unit when a print object file is detected in the folder; and the print unit configured to print the print data based on the print object information.

When an external device uses a network printer in this aspect of the invention, the external device can execute a printing process on the network printer by writing a print request (print request file) to a folder created in a file server on the network printer. Furthermore, because the network printer writes (reports) the result of printing to the same folder, the external device can access the folder and get the printing result (such as printing was successful or error information if printing fails).

More specifically, because accessing and controlling a network printer from the external device can be done by accessing the file server (file system), the printer can be used without installing a printer driver on the external device side. Furthermore, installing a printer driver not dependent on the operating system of the external device (that is, a driver compatible with the network printer itself) on the network printer side is sufficient to enable communication between the external device and network printer by accessing the file server, and a printer can be used in new operating system environments without developing a new printer driver specifically for the operating system.

The network printer according to the invention preferably also has an access privilege setting unit configured to set an access privilege to the folder for a user of the external device; wherein receiving print requests from the external device to the folder is permitted when the user is permitted to access the folder, and receiving print requests from the external device to the folder is rejected when the user is not permitted to access the folder.

This aspect of the invention enables setting the access privilege to the folder that receives print requests for users of external devices. As a result, user restrictions such as permitting specific users to use a network printer and not permitting specific users to use a network printer can be easily controlled.

DETAILED DESCRIPTION

Embodiment 1

A network device, a network printer, and a control method of a network device according to the invention are described below with reference to accompanying figures. A printing system using a network printer as an example of a network device is described below. The printing system according to this embodiment runs the printing process through a file server (file system), and does not have a printer driver installed on the external devices (client terminals).

Figure 1:
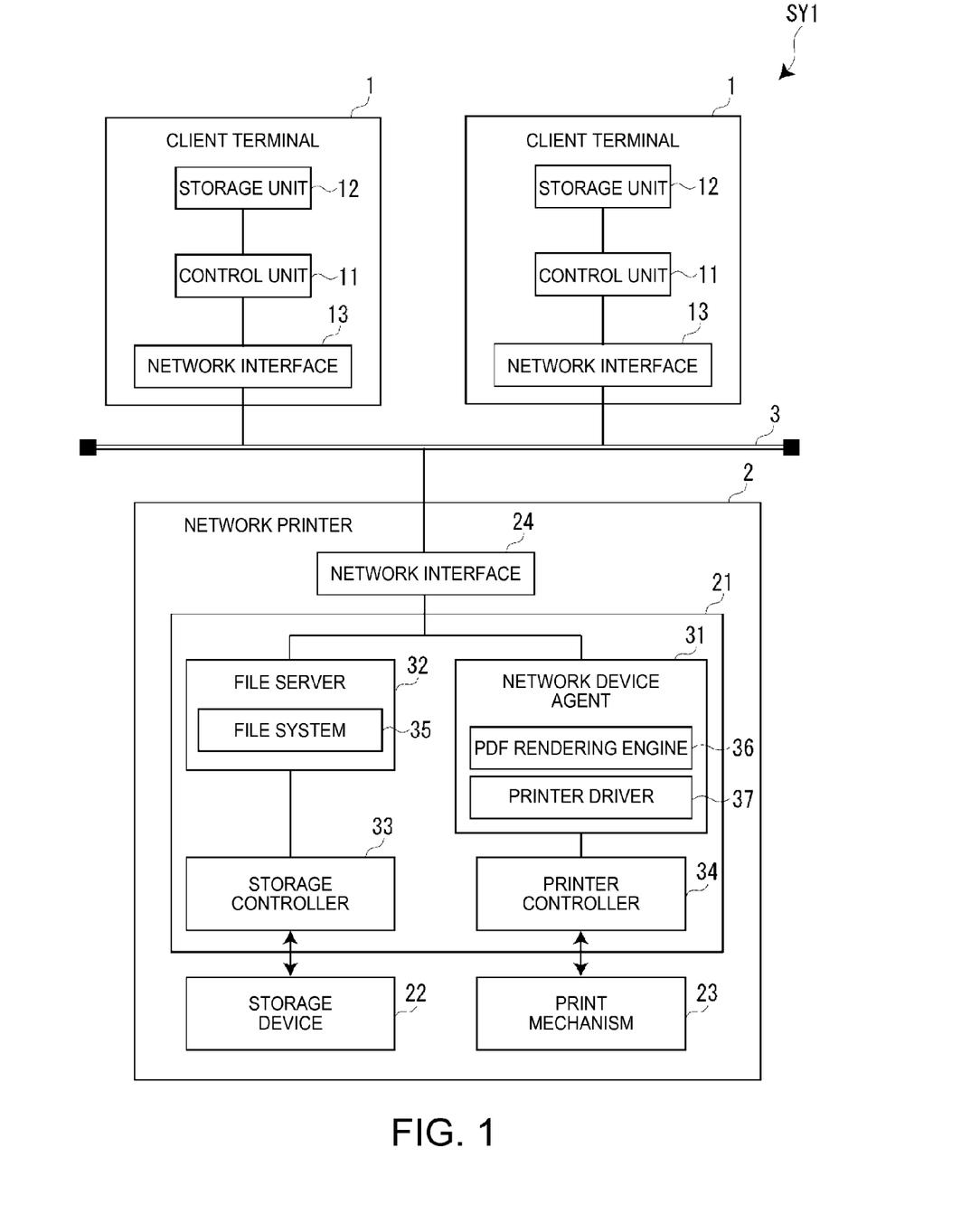
FIG. 1 is a block diagram illustrating the configuration of a printing system according to a first embodiment of the invention.

FIG. 1 is a block diagram of a printing system SY1 according to the first embodiment of the invention. As shown in the figure, the printing system SY1 includes a client terminal 1 (external devices, FIG. 1 showing an example with two client terminals 1) that are used by the user, and a network printer 2 (network device) that prints in response to print requests from the client terminals 1. The client terminal 1 and the network printer 2 are communicatively connected through a LAN (local area network) 3.

Note that the LAN connection between the client terminals 1 and network printer 2 may be a wired connection or wireless connection. In addition, two client terminals 1 are shown by example in FIG. 1, but the invention is not so limited and a desired number of client terminals 1 may be connected.

The client terminal 1 has a control unit 11, storage unit 12, network interface 13, and other hardware components typical of a common personal computer. The network interface 13 is an interface for communicating with the network printer 2 through the LAN 3.

The control unit 11 primarily includes a CPU (Central Processing Unit), ROM (Read Only Memory), and RAM (Random Access Memory). The CPU runs programs stored in ROM, and controls the client terminal 1. Control data and the control program run by the CPU to execute processes are stored in ROM. RAM is used as working memory for the CPU executing processes. Application programs and data are stored in the storage unit 12. The user may, for example, use an application program to send a print request to the network printer 2 to print data to be printed. Note that while described in further detail below, print requests from the client terminal 1 in this embodiment are made by accessing the file server 32 (file system 35) of the network printer 2. This embodiment is also described printing a PDF file as the printout.

The network printer 2 has a data processing unit 21, a storage device 22, print mechanism 23 (print unit), and network interface 24 (communication unit). The network interface 24 is an interface for communicating with the client terminal 1 through the LAN 3.

The data processing unit 21 primarily includes a CPU, ROM, and RAM. The CPU runs programs stored in ROM, and controls the client terminal 1. Control data and the control program run by the CPU to execute processes are stored in ROM. RAM is used as working memory for the CPU executing processes. By running a program stored in ROM, the CPU renders the functions of a network device agent 31, file server 32, storage controller 33, and printer controller 34.

The file server 32 provides the client terminal 1 with access to folders, files, and other information stored on the storage device 22, and manages folders and files (more specifically, manages folder names, files including file names and access privilege information, folder properties, and file directory information, for example) through functions (creating and deleting folders; writing, reading, and deleting files; setting an access privilege (attributes); and exclusive control) of the file system 35 (management unit). The storage controller 33 communicates with the file server 32 (file system 35) and controls the storage device 22. The storage device 22 may be a hard disk drive (HDD), SD card, or RAM disk, for example, and is used as the storage area of the file server 32.

The network device agent 31 controls the printing process through the file server 32 (file system 35). More specifically, the network device agent 31 creates a folder for controlling printing (referred to below as a print folder) on the file server 32, and controls the printing process based on print requests from the client terminals 1 by reading and writing files in the print folder. The network device agent 31 includes and uses a PDF rendering engine 36 and printer driver 37 to render files (PDF files) written to the print folder and create print data converted to a format that can be processed by the print mechanism 23. More specifically, the printing system SY1 of the invention enables installing a printer driver 37 that is compatible with the print mechanism 23 of the network printer 2 on the network printer 2 (network device agent 31), and does not require a device driver specific to the operating system of a particular client terminal 1.

The printer controller 34 controls the print mechanism 23 and prints based on print data produced by the network device agent 31. The print mechanism 23 includes a paper conveyance mechanism, printhead, and paper cutter mechanism, as well as various sensors, a receive buffer for temporarily storing print data, font memory storing font data, parameter memory for storing printer configuration settings, and executes a printing operation as controlled by the printer controller 34.

Figure 2:
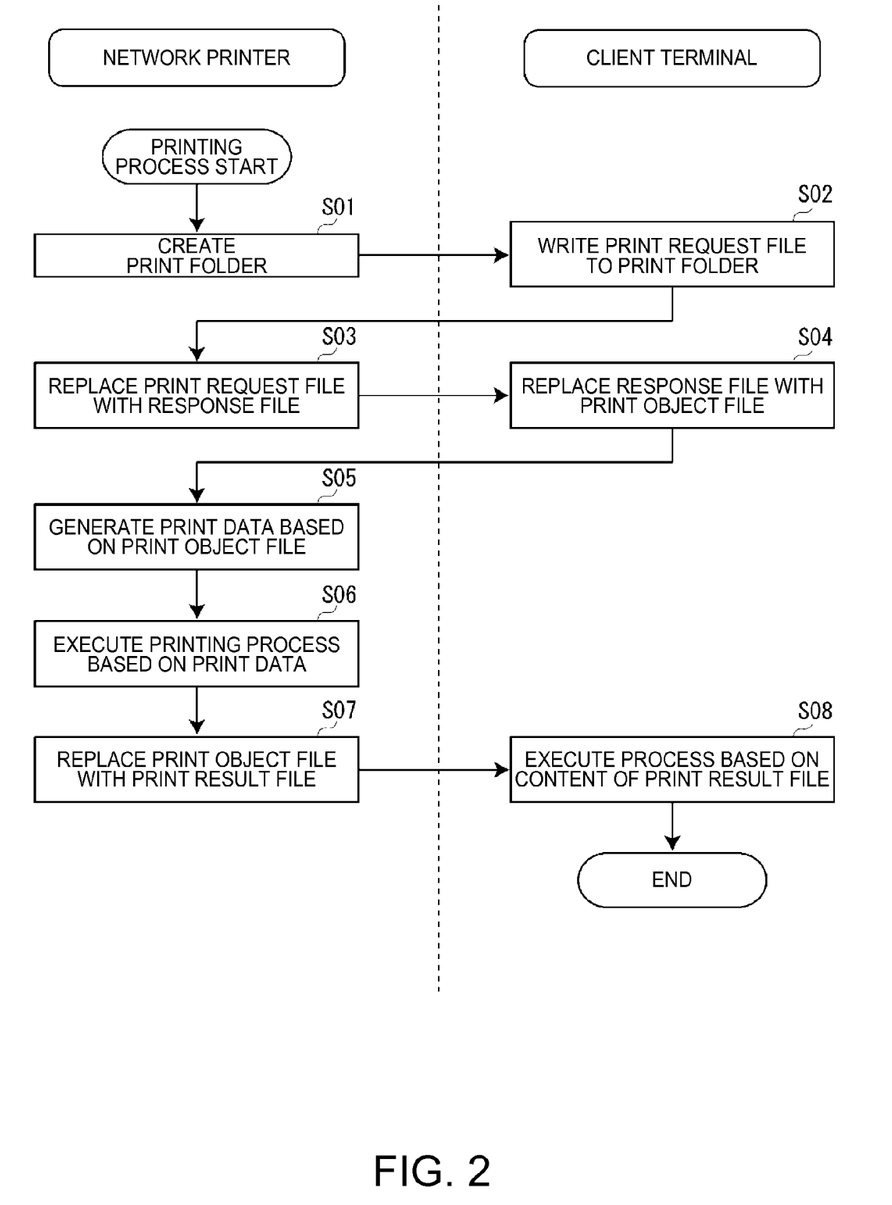
FIG. 2 is a flow chart describing the printing process in the first embodiment of the invention.

The printing process of the printing system SY1 is described next with reference to the flow chart in FIG. 2. As described above, the printing process in this embodiment of the invention is executed by accessing the file server 32 (file system 35) of the network printer 2 from a client terminal 1.

When the network printer 2 (CPU) is connected to the network (LAN 3) and turns on, a print folder for receiving print requests (process request) from the client terminals 1 is created in the file server 32 by the network device agent 31 (S01, folder creation unit). Using functions of the file system 35, the network device agent 31 sets access privilege (whether or not accessing the print folder is allowed) to the print folder for each client terminal 1 user (access privilege setting unit). More specifically, this sets whether or not printing through the network printer 2 is allowed based on whether or not accessing the print folder is allowed. Note that the print folder may be created as a folder shared by all client terminals 1 or all users, or the print folder may be created individually for a particular client terminal 1 or user.

To assert a print request to the network printer 2, the client terminal 1 (CPU) writes a file (process request information; referred to below as a print request file) expressing the print request to the print folder created in the file server 32 (S02). If the user operating the client terminal 1 does not have permission to print (if accessing the print folder is not allowed by the access privilege setting described above), writing the print request file to the print folder is rejected. Note that a file name enabling identifying the print job and user asserting the print request is assigned to the print request file. For example, if the identification information of the user (user ID) using the client terminal 1 is User1, and the request print job is Job1, the filename of the print request file is User1Job1.req.

When the network device agent 31 (print request detection unit, detection unit) detects that a print request file (such as User1Job1.req) was written to the print folder, the network printer 2 determines if printing is allowed. If printing is allowed, the network printer 2 creates a response file (User1Job1.rdy) with the file extension set to a specific extension ("rdy" in this example) and a file size that can be written for printing. The print request file (User1Job1.req) is then replaced by the created response file (UserJob1.rdy) (S03, response substitution unit, process execution unit).

If print requests are received simultaneously from plural users (if plural print request files are written), the process of step S03 is applied to one of the print request files allowed to be printed, and after the specific process is completed with the print request file, the same process is applied to the next print request file. More specifically, the network device agent 31 schedules print requests from the client terminals 1. This scheduling is determined by a specific algorithm, such as processing the print request files in the order they are written.

Next, when the client terminal 1 detects a response file (User1Job1.rdy) written by the network printer 2 (network device agent 31) in the print folder, the client terminal 1 replaces the response file with the PDF file to be actually printed (such as User1Job1.pdf, the print object file (print object information)) (S04).

Next, when the network device agent 31 detects the PDF file (User1Job1.pdf) in the print folder (print object detection unit, process execution unit), the network printer 2 renders the PDF file by the PDF rendering engine 36 and printer driver 37 and creates print data (S05, print data generating unit, process execution unit). The network device agent 31 then sends the generated print data to the printer controller 34, and the printer controller 34 operates the print mechanism 23 and prints based on the print data (S06).

When the printing process ends, the network device agent 31 replaces the PDF file in the print folder with a file containing the print result status (such as User1Job1.rlt, referred to below as the print result file) (S07, print result reporting unit, process result reporting unit). Whether or not the printing process was successful (completed normally), or error information (such as information indicating the paper ran out) when the printing process fails, is written as the print result status. The result of printing can be reported to the client terminal 1 (user) by this print result file. Next, the client terminal 1 references the print result file (User1Job1.rlt), and if the printing process ended normally, deletes the file and ends the printing process. If the printing process did not end normally, the user performs an appropriate error handling operation according to the content of the print result file (S08).

Note that if an error such as a no-paper error results from another print job while the client terminal 1 is writing the PDF file (print object file) to the print folder, a print result file indicating the error is written to the same folder (to the folder to which the PDF file is being written) to inform the client terminal 1. This enables interrupting printing by interrupting writing the PDF file by the client terminal 1 that received the error report.

As described above, when a client terminal 1 uses a network printer 2 in this first embodiment of the invention, the printing process can be executed by writing a file to a print folder created in the file server 32 of the network printer 2. Because the network printer 2 writes the print result status as a print result file to the print folder, the client terminal 1 (user) can access the print result file in the print folder and get the print result (for example, that printing was successful or error information if printing failed). More specifically, because accessing and controlling the network printer 2 from the client terminal 1 can be done by accessing the file server 32 (file system 35), the printer can be used easily without installing a printer driver or other special software on the client terminal 1 side. Furthermore, it is only necessary to install a printer driver 37 (a printer driver not dependent on the OS of the client terminal 1) compatible with the print mechanism 23 of the network printer 2 on the network printer 2 side, and the printer can be used in new operating system environments without developing a new printer driver specifically for the operating system.

Figure 3:
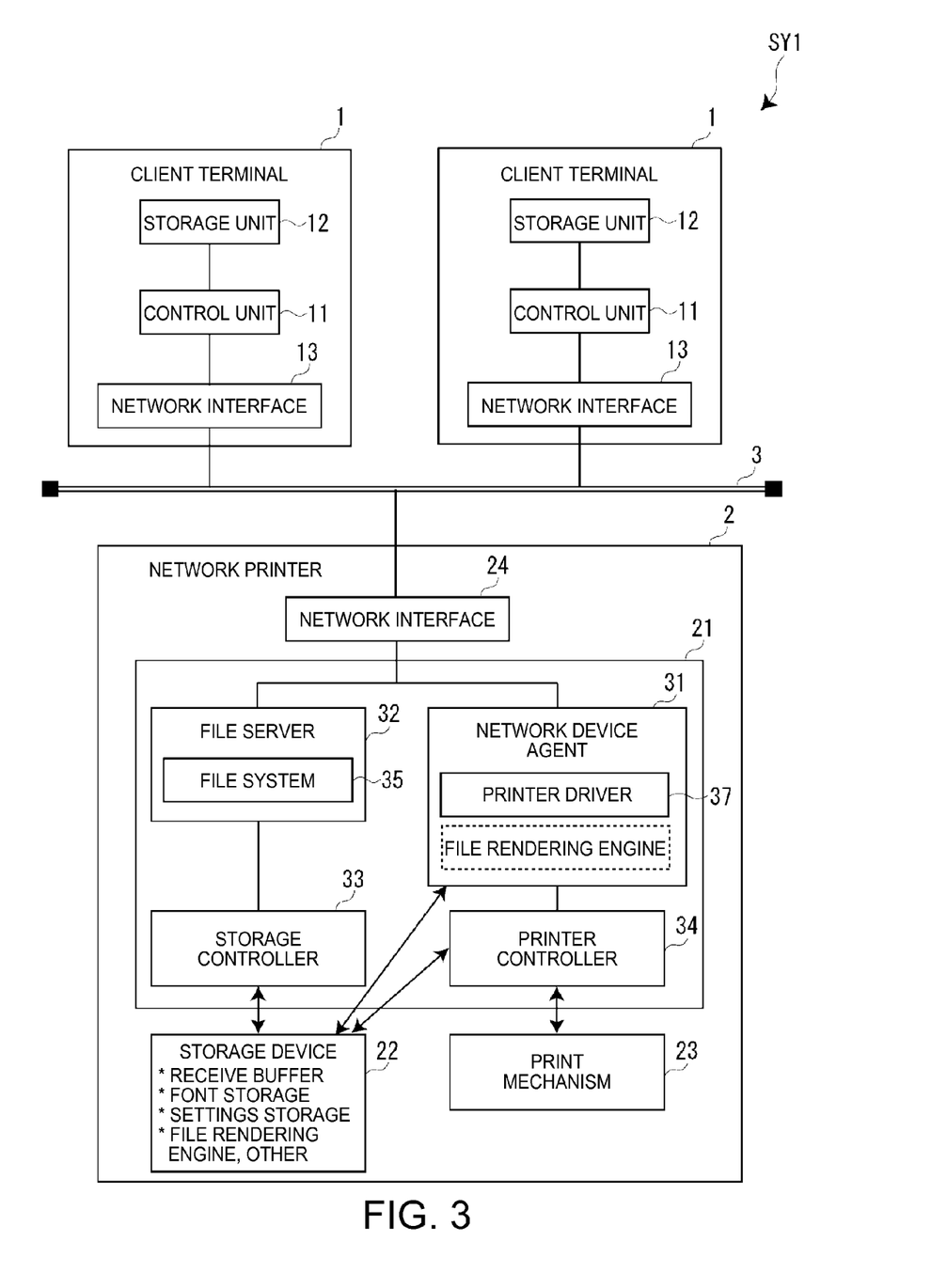
FIG. 3 is a block diagram illustrating the configuration of a variation of the printing system.

This embodiment is described using a PDF file as an example of a print object file, but the invention is not so limited are other file types are conceivable. For example, the print object file may be an HTML file. In this event, the network device agent 31 may be configured with an HTML rendering engine. As shown in FIG. 3, file rendering engines (such as a PDF rendering engine or HTML rendering engine) may be stored on the storage device 22, and the network device agent 31 may be configured to read and run the appropriate engine. By the network device agent 31 thus directly accessing the storage device 22, resources can be shared and cost performance and access speed can be improved.

In this embodiment, the receive buffer, font memory, and configuration settings memory required in the printer configuration for printing are disposed in the print mechanism 23 and store data of different types, but a configuration in which the data is stored in the storage device 22 and the printer controller 34 reads data from the storage device 22 is also conceivable (see FIG. 3). This configuration enables minimizing increasing memory and configuring the network printer 2 through the file system 35. Furthermore, if the printer settings information and font data stored in the file server 32 are used to configure the printer, printer configuration can be done by copying the configuration file to the network-connected printer (file server 32), and device configuration can be completed efficiently.

Furthermore, when the start of printing is delayed or there is insufficient storage memory because the file size of the print object file (such as a PDF file) is large, the print object file may be divided into segments and printed continuously. In this event, the file names of the print object file segments are preferably file names that clearly indicate the file was segmented.

Furthermore, by using storage that emulates an SD card or other removable memory as the storage device 22 in this embodiment, information that the storage was virtually swapped may be reported to the file server 32 and a status file created when a problem such as the paper running out occurs while printing. As a result, the client terminal 1 (user) can be informed that a major error (an error that should be addressed immediately) occurred in the network printer 2.

When the network printer 2 has a plurality of print mechanisms (such as a print mechanism for printing receipts and a print mechanism for printing slips), a print folder is created for each print mechanism, and which print mechanism should be used for printing can preferably be identified.

Yet further, an authentication unit (security engine, not shown in the figures) for verifying digital signatures may be disposed to the network device agent 31 in this embodiment, and the digital signature applied to the print object file evaluated using a public key, to print only files with a valid signature. This configuration enables printing data that has not been tampered with. Note that the public keys may be written to the print folder and shared through the file server 32, or the network device agent 31 may download the public keys from an external server (not shown in the figure).

Yet further, a password may be set in the print object file (such as PDF file) of the invention, and the print object file printed when the matching password is stored in the network printer 2. This configuration can prevent document forgery, for example.

Figure 4:
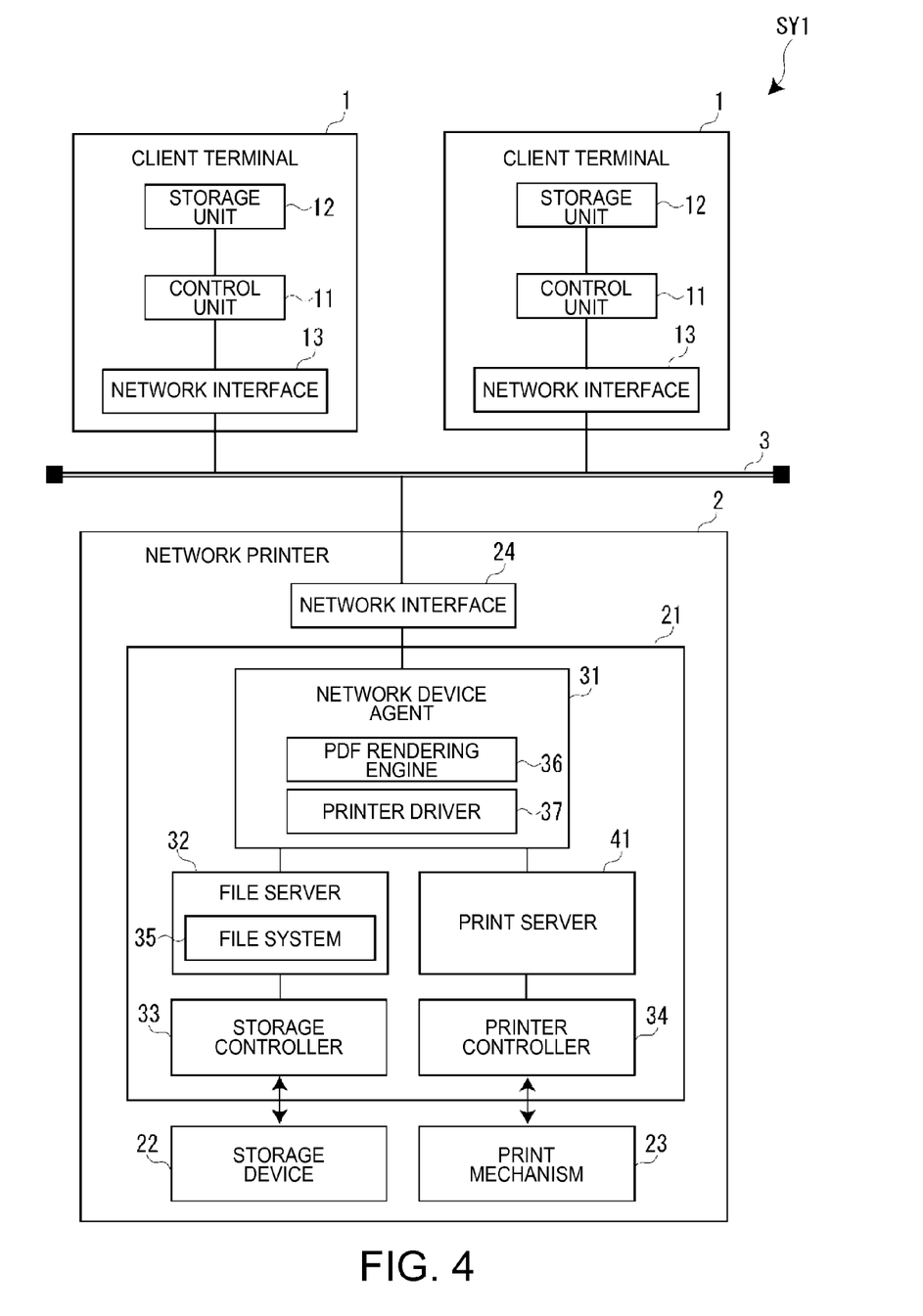
FIG. 4 is a block diagram illustrating the configuration of a variation of the printing system.

A variation of the printing system SY1 according to the first embodiment of the invention may be configured with a print server 41 added to the network printer 2 as shown in FIG. 4. In this event, the printing process is executed through the file server 32 when a print request file is received from the client terminal 1, and the printing process is executed through the print server 41 when print data is received from the client terminal 1. More specifically, whether the printing process is executed through the file server 32 or the printing process is executed through the print server 41 changes according to the data received from the client terminal 1. User is therefore possible to use the printer in an environment having a mixture of client terminals without an installed printer driver and client terminals with an installed printer driver. Note that a configuration in which the network device agent 31 receives data (print request file and print data) sent from the client terminal 1, and the network device agent 31 determines whether to run the printing process through the file server 32 or run the printing process through the print server 41, is also conceivable. Further alternatively, a configuration in which the print server 41 directly receives and processes print data sent from the client terminal 1 without going through the network device agent 31 is also conceivable.

Embodiment 2

A second embodiment of the invention is described next with reference to FIG. 5 and FIG. 6. A network printer 2 is used as an example of a network device in the first embodiment described above. This embodiment differs by using a network scanner 51 as the network device. The differences with the first embodiment are described below. Note that like parts in this and the first embodiment are identified by the same reference numerals, and further description thereof is omitted. Variations applicable to the same parts in the first embodiment are also applicable in the same way to this embodiment.

Figure 5:
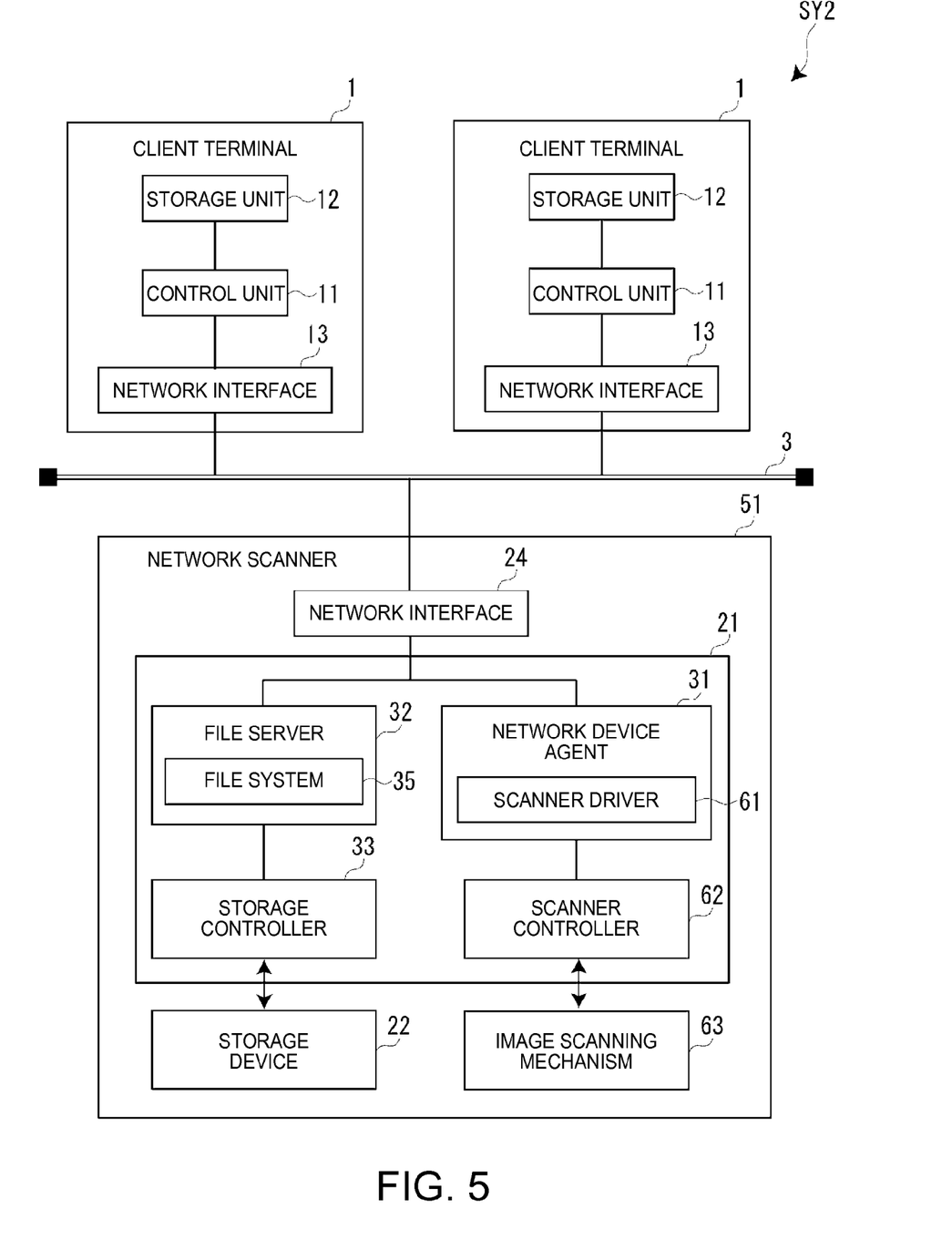
FIG. 5 is a block diagram illustrating the configuration of a scanning system according to a second embodiment of the invention.
Figure 6:
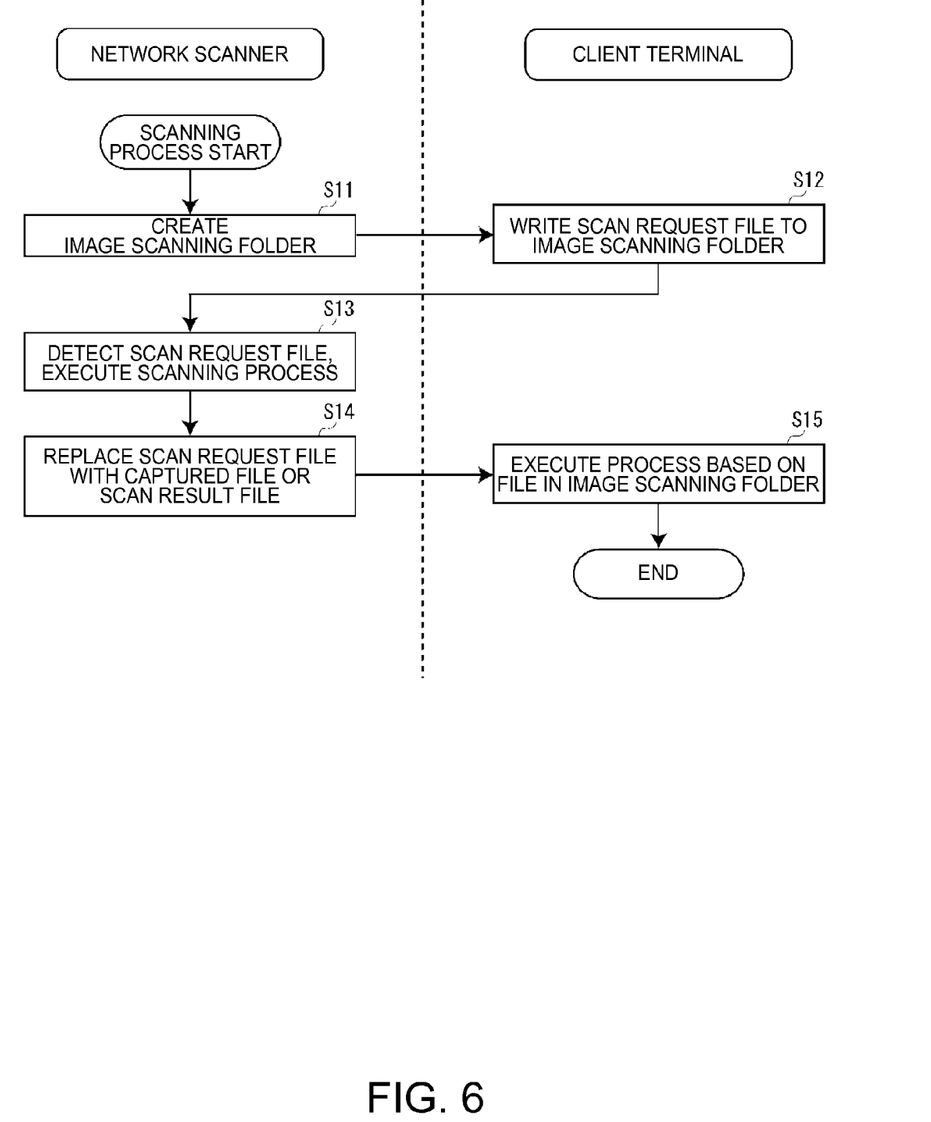
FIG. 6 is a flow chart describing the image scanning process in the second embodiment of the invention.

FIG. 5 is a block diagram illustrating the configuration of a scanning system SY2 according to this embodiment. As shown in the figure, the network scanner 51 (network device) in the scanning system SY2 according to this embodiment has a scanner driver 61, scanner controller 62, and image scanning mechanism 63 instead of the printer driver 37, printer controller 34, and print mechanism 23 (see FIG. 1) of the network printer 2 in the first embodiment. The scanner driver 61 controls the scanner controller 62, asserts read commands (scan commands) to the scanner controller 62, and captures image data read by the image scanning mechanism 63. The scanner controller 62 controls the image scanning mechanism 63 and scans a target document based on a command from the scanner driver 61. The image scanning mechanism 63 is an image sensor using a CCD (charge coupled device), and optically reads documents (text and images) placed on the image platen as controlled by the scanner controller 62.

The image scanning process of the scanning system SY2 is described next with reference to the flow chart in FIG. 6. The image scanning process in this embodiment of the invention is executed by the client terminal 1 accessing the file server 32 (file system 35) of the network scanner 51.

When the network scanner 51 (CPU) is connected to the network (LAN 3) and the power turns on, an image scanning folder for receiving scan requests (process request) from the client terminals 1 is created in the file server 32 by the network device agent 31 (S11, folder creation unit). Using functions of the file system 35, the network device agent 31 sets access privilege to the image scanning folder for each user of the client terminal 1 (access privilege setting unit).

To assert a scan request to the network scanner 51, the client terminal 1 (CPU) writes a file (process request information; referred to below as a scan request file) expressing the scan request to the image scanning folder created in the file server 32 (S12). If the user operating the client terminal 1 does not have permission to access the image scanning folder, writing the scan request file to the image scanning folder is rejected.

When the network device agent 31 (detection unit) detects that a scan request file (such as User2Job1.req) was written to the image scanning folder, the network scanner 51 determines if operation is allowed. If operation is allowed, the network scanner 51 scans the object to be scanned (such as a document) with the scanner driver 61, scanner controller 62, and image scanning mechanism 63 (S13, process execution unit).

If scanning is successful, the network device agent 31 replaces the scan request file in the image scanning folder with the captured image data (an image file (process result) such as User2Job1.jpg). If scanning fails, the network device agent 31 replaces the scan request file (User2Job1.req) in the image scanning folder with a file (such as User2Job1.rlt, referred to below as the scan result file) containing the scan result status (error information) (S14, print result reporting unit).

The client terminal 1 determines that the scanning process was successful if there is an image file (User2Job1.jpg) in the image scanning folder, moves the image file to the storage unit 12 (deleting the image file in the image scanning folder), and ends the process. If the scan result file (User2Job1.rlt) is in the image scanning folder, the client terminal 1 determines the scanning process failed and moves the scan result file to the storage unit 12 (deleting the scan result file in the image scanning folder). The user then performs an appropriate error handling operation according to the content of the scan result file (S15).

As described above, when a client terminal 1 uses a network scanner 51 in this second embodiment of the invention, the scanning process can be executed by the network scanner 51 by writing a scan request file to a image scanning folder created in the file server 32 of the network scanner 51. Because the network scanner 51 writes the result of scanning as file to the image scanning folder, the client terminal 1 can access the file in the image scanning folder and get the result of scanning. More specifically, accessing and controlling the network scanner 51 from the client terminal 1 can be done by accessing the file server 32 (file system 35) as in the first embodiment.

Embodiment 3

A third embodiment of the invention is described next with reference to FIG. 7. A network printer 2 is used as an example of a network device in the first embodiment described above. This embodiment differs by using a kitchen display 71 as the network device. The differences with the first embodiment are described below. Note that like parts in this and the first embodiment are identified by the same reference numerals, and further description thereof is omitted. Variations applicable to the same parts in the first embodiment are also applicable in the same way to this embodiment.

Figure 7:
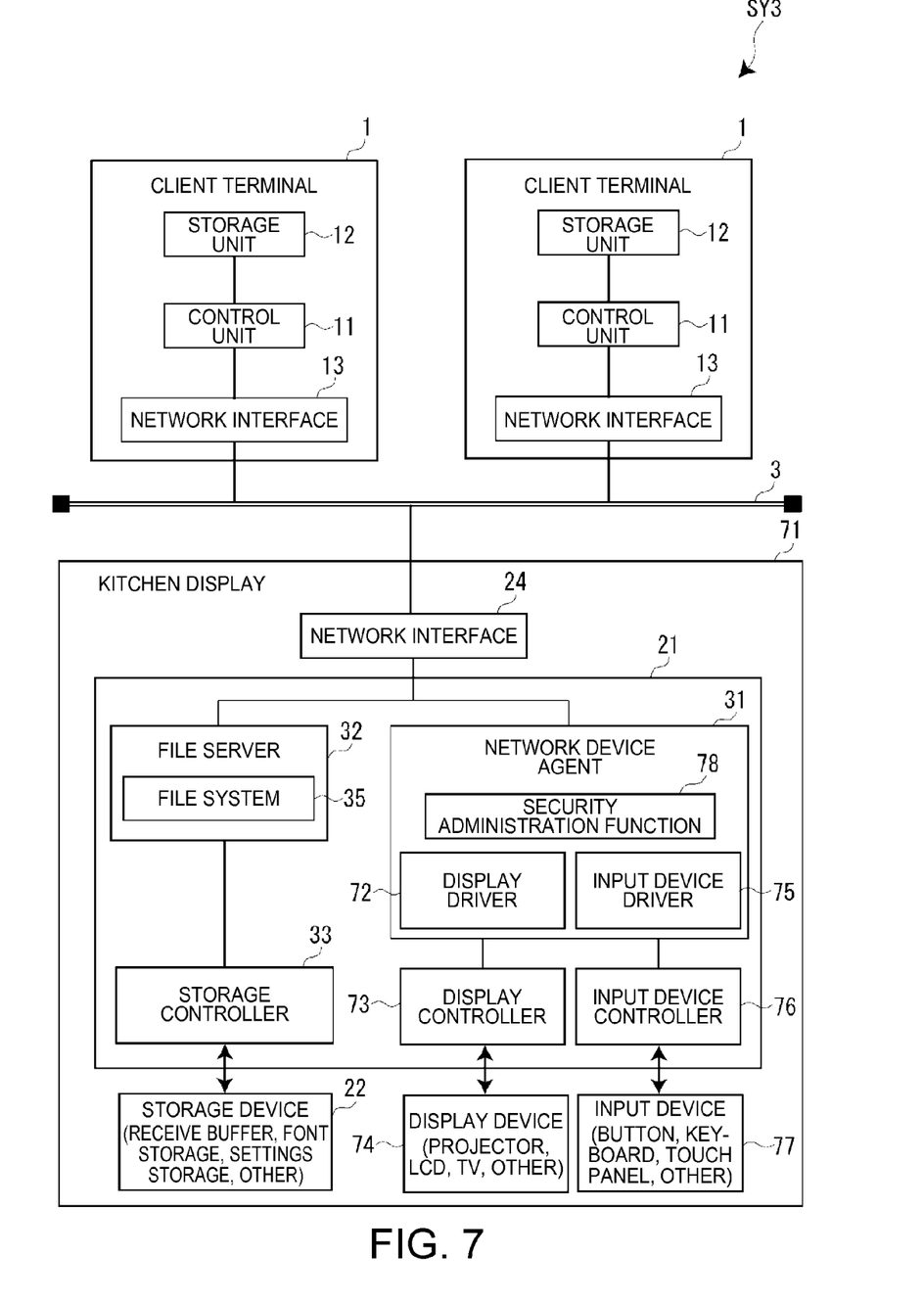
FIG. 7 is a block diagram illustrating the configuration of a kitchen display system according to a third embodiment of the invention.

FIG. 7 is a block diagram illustrating the configuration of a kitchen display system SY3 according to this embodiment. As shown in the figure, the network scanner 51 (network device) in the scanning system SY2 according to this embodiment has a display device 74 (such as a projector, LCD (liquid crystal display), or TV), a display driver 72 that controls the display device 74, a display controller 73, an input device 77 (such as a keyboard, touch panel, or buttons; also called a bumper), an input device driver 75 (bumper driver) for controlling the input device 77, and an input device controller 76 (bumper controller) instead of the printer driver 37, printer controller 34, and print mechanism 23 (see FIG. 1) of the network printer 2 in the first embodiment. The network device agent 31 also has a security administration function 78 and sets the access privilege to the kitchen display 71 from the client terminal 1. This configuration enables constructing a highly versatile kitchen display system SY3 that can display information stored in the storage device 22, and clear displayed content by deleting a file specified by the input device 77 connected to the network device agent 31. More specifically, as in the first embodiment and second embodiment, accessing and controlling the kitchen display 71 from the client terminal 1 by accessing the file server 32 can be enabled (file system 35).

The first to third embodiments described above use a printer, scanner, and kitchen display (display) as examples of network devices, but these are obviously examples only and the invention is not limited thereto. For example, the invention can also be applied when using a multifunction device with both printer and scanner functions, or a label printer, for example, as a network device.

The functions of the systems (printing system SY1, scanning system SY2, and kitchen display system SY3) according to the foregoing embodiments and variations thereof can also be provided as software programs. Such programs can also be provided stored on a recording medium (not shown in the figure). Examples of such recording media include CD-ROM, flash ROM, memory card (including CompactFlash (T), smart media, and memory sticks), Compact Disc media, magneto-optical discs, Digital Versatile Discs, and floppy disks.

The device configuration and process steps of the printing system SY1, scanning system SY2, and kitchen display system SY3 are also not limited to the foregoing embodiments and variations thereof, and can be appropriately modified without departing from the scope of the invention.

INDUSTRIAL APPLICABILITY

As described above, the invention is useful in systems having printers, scanners, and other devices connected through a network, and can be used appropriately in POS systems, kitchen display systems, and printing systems, for example.

REFERENCE SIGNS LIST 1 client terminal
2 network printer
3 LAN
23 print mechanism
31 network device agent
32 file server
35 file system
36 PDF rendering engine
37 printer driver
41 print server 51 network scanner
61 scanner driver
63 image scanning mechanism
71 kitchen display
72 display driver
74 display device
75 input device driver
77 input device
SY1 printing system
SY2 scanning system
SY3 kitchen display system

The invention claimed is:

1. A network device comprising:
a file server including a manager, configured to manage a folder containing a folder name, and a file containing a file name and an access control information;
a folder creator configured to create the folder on the file server to receive a process request file from an external device through the manager;
a process request detector configured to detect receiving the process request file in the folder;
a response substitutor configured to create and replace the process request file with a response file indicating the process request file can be processed when the process request file is written to the folder;
a process object detector configured to detect replacement of a process object file corresponding to a process object information with the response file in the folder;
a process data generator configured to generate process data based on the process object information that converted the process object file to a format processable by a process executor when the process object file is detected in the folder;
the process executor configured to execute based on the process object information corresponding to the process request file when the process request file is received in the folder; and
a process result reporter configured to report the process result of the process executor to the folder.

2. The network device described in claim 1, further comprising:
an access privilege setting section configured to set an access privilege to the folder for a user of the external device;
wherein receiving the process request file from the external device to the folder is permitted when the user is permitted to access the folder, and
receiving the process request file from the external device to the folder is rejected when the user is not permitted to access the folder.

3. A network printer comprising:
a communicator configured to communicate with an external device through a network;
a file server including a manager, configured to manage a folder containing a folder name, and a file containing a file name and an access control information;
a folder creator configured to create the folder on the file server to receive a print request file written to the folder from the external device through the manager;
a print request detector configured to detect receiving the print request file in the folder;
a response substitutor configured to create and replace the print request file with a response file indicating the print request file can be processed when the print request file is written to the folder;
a print object detector configured to detect replacement of a print object file corresponding to a print object information with the response file in the folder;
a print data generator configured to generate print data based on the print object information that converted the print object file to a format processable by a print mechanism when the print object file is detected in the folder;
the print mechanism configured to print based on the print object information corresponding to the print request file when the print request file is received in the folder; and
a process result reporter configured to report the print result of the print mechanism to the folder.

4. The network printer described in claim 3, wherein the manager further configures to manage folder properties or directory information for the file.

5. The network printer described in claim 3, further comprising:
an access privilege setting section configured to set an access privilege to the folder for a user of the external device;
wherein receiving the print request file from the external device to the folder is permitted when the user is permitted to access the folder, and
receiving the print request file from the external device to the folder is rejected when the user is not permitted to access the folder.

6. A control method of a network device, comprising:
creating a folder to receive a process request file written to the folder from an external device connected by a network;
detecting receiving the process request file in the created folder;
creating and replacing the process request file with a response file indicating the process request file can be processed when the process request file is written to the folder;
detecting replacement of a process object file corresponding to a process object information with the response file in the folder;
generating process data based on the process object information that converted the process object file to a format when the process object file is detected in the folder;
executing a process based on the process object information corresponding to the process request file when the process request file is received in the folder; and
reporting the execution result of the process contained in the process request file to the folder.

* * * * *